United States Patent [19]

Kasahara

[11] Patent Number: 4,978,118
[45] Date of Patent: Dec. 18, 1990

[54] PAPER SHEET TRANSPORTING METHOD THAT APPLIES AN ELECTROSTATIC ATTRACTIVE FORCE BETWEEN A PAPER SHEET AND A REINFORCING INSULATING SHEET PRIOR TO FEEDING

[75] Inventor: Keiji Kasahara, Kakegawa, Japan
[73] Assignee: Abisare Co., Ltd., Kakegawa, Japan
[21] Appl. No.: 365,302
[22] Filed: Jun. 13, 1989

[30] Foreign Application Priority Data

Jan. 13, 1989 [JP] Japan .................................. 1-6281

[51] Int. Cl.$^5$ ............................................ B65H 29/30
[52] U.S. Cl. .................................... 271/275; 271/193;
226/94; 156/273.1
[58] Field of Search ...................... 271/18.1, 275, 193,
271/901; 226/94; 156/273.1

[56] References Cited

U.S. PATENT DOCUMENTS 3,981,498  9/1976  Fletcher ............................... 271/193
4,129,469  12/1978  Deverell et al. .................. 226/94 X
4,182,222  1/1980  Stahl ............................. 156/273.1 X Primary Examiner—Andres Kashnikow
Assistant Examiner—Kenneth R. DeRosa

[57] ABSTRACT

A paper sheet transporting method comprises a step of superposing a paper sheet on a reinforcing sheet and a step of affording an electrostatic attractive force between the sheets due to electrostatic charges given thereto. The reinforcing sheet is made of a substance selected from plastics that are of a highly insulating nature and retain the electrostatic charge for a long period of time so as to have a remaining attractive force. A step of gripping the thus electrostatically charged sheets between a pair of transporting rollers is carried out so as to transport the sheets in a tangential direction of the rollers while the sheets are still sticking to each other. The paper sheet is transported by the reinforcing sheet to a work station therefor without producing any deformation or torsion, and the paper sheet is removed from the reinforcing sheet after being processed at the work station.

7 Claims, 2 Drawing Sheets

PAPER SHEET TRANSPORTING METHOD THAT APPLIES AN ELECTROSTATIC ATTRACTIVE FORCE BETWEEN A PAPER SHEET AND A REINFORCING INSULATING SHEET PRIOR TO FEEDING

BACKGROUND OF INVENTION

The invention relates to a method for transporting paper sheets of a relatively small thickness such as the drawing sheets used in plotters and the copying sheets used in copying machines, and in particular to a method for stably transporting such paper sheets into, out of or within said plotters, copying machines or the like, by means of transporting rollers Each of the plotters comprises a pen such as an automatically controlled drawing means for automatic drawing machines such that a dependent variable is treated as a mathematical function of variables. There are two types of plotters, one of them being such that the sheets of recording paper are transported in a direction "X" by transporting rollers while a recording pen in moved in another direction "Y" perpendicular to the direction of "X". The other plotter is such that the sheet of recording paper is attracted to and fixed in a plane member while only the recording pen is moved in the directions "X" and "Y".

In the known plotters having a mechanism for motion in both the directions "X" and "Y", comparatively thin sheets of recording paper are used which weigh 20 to 50 kg per 1,000 sheets of a size of 1,091×788 mm. Such sheets are too flexible for the transporting rollers to transmit their rotational force to the sheets in a moving direction thereof. This prevents an accurate transportation of said sheets, resulting in a lower accuracy of the recorded drawings.

The inventor of the present invention therefore has already proposed an improvement, for which an application was filed in Japan, and which incorporated an adhesive sheet to stick to the recording sheets so as to be held and transported by the transporting rollers.

However, this improvement also has a problem in that the adhesive agent coated on the adhesive sheet brings about unevenness of the surface thereof, thus preventing the recording pen from smoothly running over the recording sheets. Further, the position of coated adhesive agent is to be altered according to a change in the size of recording sheets. Setting operation of the recording sheets becomes uneasy, lowering the efficiency of the drawing works.

On the other hand, the accuracy of reproduction is likely to become poor in certain kinds of copying machines, in particular those of dry copying type, when an original and a thin sheet of copying paper are superposed to be transported into, within and out of the copying machine.

SUMMARY OF THE INVENTION

Therefore, it is an object of the present invention to provide a method in which thin sheets of the drawing or recording paper or thin sheets of copying paper are stably held and exactly transported by transporting rollers in the plotter or the copying machine in such a state that accuracy of drawing or of reproduction is improved.

It is another object of the present invention to provide a paper sheet transporting method in which a writing pen in plotters or a movable member in copying machines can move smoothly without suffering any hindrance, and intricacy in setting the paper sheets such as drawing paper is eliminated.

In order to achieve these objects, the invention provides a paper sheet transporting method comprising: a step of superposing a paper sheet on a reinforcing sheet; a step of affording an electrostatic attractive force between the paper sheet and the reinforcing sheet due to electrostatic charges given to said paper sheet and said reinforcing sheet; the reinforcing sheet being made of a substance selected from plastics that are of a highly insulating nature and retain the electrostatic charge for a long period of time so as to have a remaining attractive force; and a step of gripping the thus electrostatically charged paper sheet and the charged reinforcing sheet between a pair of transporting rollers, and thereby transporting said paper sheet and reinforcing sheet in a tangential direction of said rollers while said sheets are still sticking to each other, whereby the paper sheet is transported by the reinforcing sheet to a work station therefor without producing any deformation or torsion, wherein the paper sheet is removed form the reinforcing sheet after being processed at the work station.

Where the present invention is exercised in a copying machine, in particular, in those of dry copying type, an original and a copying sheet are superposed one on another and in close contact with each other to be held on the reinforcing sheet.

Drawing operations may be carried out in the plotter, according to the invention in such a manner that the electrostatic charging device imparts electrostatic charges to the drawing sheet and the reinforcing sheet which is made of a substance capable of exerting a remaining attractive force. The reinforcing sheet to which the drawing sheet is sticking is then born by the transporting rollers to thereby be exactly transported even if the drawing paper were as thin as tracing papers.

There arises no irregularities protruding from the surface of the drawing sheet of paper that are attracted to the reinforcing sheet. This reinforcing sheet bears against and is transported by the rollers thereby ensuring smooth motion of the drawing pen or other recording means. Further, there is no need to change the position of the adhesive agent on the adhesive paper as previously proposed by us, even where the size of a drawing sheet is sometimes changed. Thus, the work of setting the drawing sheet in place is also made easy by the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
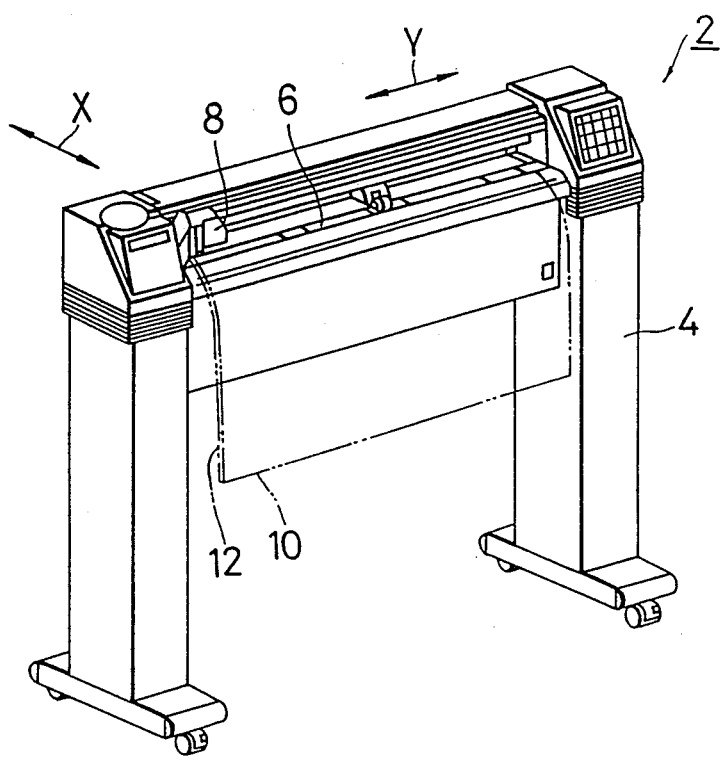
FIG. 1 is a perspective view showing a first embodiment of the invention in an X-Y plotter.

In a first embodiment illustrated in FIG. 1, a plotter 2 of a X-Y motion type comprises a main body 4, a pair of transporting rollers 6, a pen 8 as a writing means, and a drawing sheet of paper 10 used in the plotter. The drawing sheet 10 is transported by the rollers 6 in a direction shown by an arrow X while the pen 8 is moved in another direction perpendicular to the direction X, as shown by an arrow Y in order to make drawings.

Figure 2:
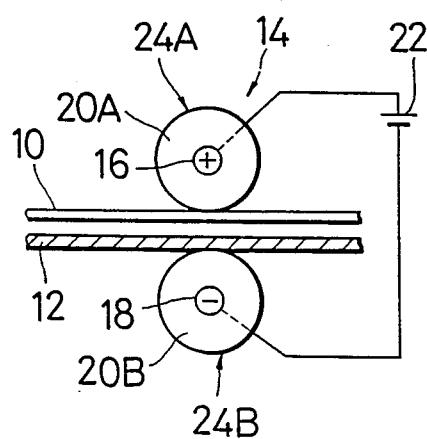
FIG. 2 is a side elevation of an electrostatic attraction device utilized in the first embodiment.

The plotter 2 comprises an electrostatic attraction device 14 that is illustrated in FIG. 2 and has a reinforcing sheet made of a substance showing a remaining attractive force. The electrostatic attraction device is adapted to impart electrostatic charges to the drawing sheet 10 and the reinforcing sheet 12, the former sheet thereby being attracted to and carried by the latter sheet so as to be held by the rollers 6.

The substance of reinforcing sheet 12 is about 20 to 150 μm in thickness and is selected from highly insulating and easily charged plastics having a value of volume resistivity of or higher than $10^{13}$ Ω cm. Examples of said plastics are polyester, polycarbonate, ABS resin, polypropylene, polyacetals, and PBT resin, and the selection thereof is made considering their flexibility-rigidity balance, their elongation contraction behavior, their wear-resistance and their costs.

The electrostatic attraction device 14 comprises a pair of electrodes 16 and 18, attracting parts 20(20A and 20B), and a power source 22, and is incorporated but not integral with the plotter 2 in the first embodiment. The attracting parts 20A and 20B are formed on outer peripheral portions of a first roller 24A and a second roller 24B, respectively. The electrodes 16 and 18 are respectively installed for said attracting parts 20A and 20B, and are electrically connected to the power source 22.

In operation, the power source 22 gives electric charges to the pair of electrodes 16 and 18 to thereby cause induction charging of the attracting parts 20A and 20B. The drawing sheet 10 and the reinforcing sheet 12 are gripped in a gap between the rollers 24A and 24B so as to advance through the gap whereby said sheets 10 and 12 come into contact with and are induction-charged by said attracting parts 20A and 20B, respectively and spontaneously. The induced electrostatic charges on the portions of said sheets, said portions being in contact with said attracting parts, have respectively polarities different from those of said electrodes 16 and 18. The thus induced electrostatic charges on the drawing and the reinforcing sheets 10 and 12 give rise to an electrostatic attraction between them and between those charges which are born by the electrodes, respectively. In this way, said sheets 10 and 12 are attracted to said attracting parts 20A and 20B, and at the same time are attracted to each other.

The drawing sheet 10 is attracted to the reinforcing sheet 12 which is made of such a substance which the remaining attractive force can travel through the first and second rollers 24A and 24B without being undesirably separated from the reinforcing sheet 12. This effect results from a fact that said reinforcing sheet 12 is made of highly insulating plastics which are easily charged with electrostatic charges that are hardly lost in the course of time. Accordingly, the drawing sheet 10 remains attracted even after the reinforcing sheet 12 is removed from the attracting parts 20 or even if the power source 22 for the electrodes 16 and 18 is turned off.

In the case where, as in the first embodiment, the respective electrodes 16 and 18 are provided for the respective attracting parts 20A and 20B, the drawing sheet 10 is charged directly and at the same time when the reinforcing sheet 12 is charged, with strong potentials.

Our experiments have revealed that the comb-shaped electrodes 16 and 18 supplied with electric current from the power source 22 do exert their strongest attraction to those portions of the material which are in close contact with said electrodes. Thus, plus charges as well as minus charges are induced at adjacent portions of the reinforcing sheet 12, consequently suggesting that said plus and minus charged portions should not be relatively displaced when the reinforcing sheet 12 advances apart the attracting parts 20. We therefore recognized that in order to obtain stronger attraction, said drawing and reinforcing sheets 10 and 12 are to be simultaneously charged instead of being charged stepwise such that the reinforcing sheet 12 has previously been charged.

The reinforcing sheet 12 attacks the drawing sheet 10 and then comes into contact with the transporting roller 6 to thereby be moved in the direction of the arrow X towards the pen 8 which is reciprocating in the direction of the arrow Y in the X-Y plotter, thus making desired drawings. The portion of said drawing sheet 10 onto which said drawings have been formed is subsequently removed from said reinforcing sheet 12.

In the first embodiment just described above, the transportation of drawing sheets is conducted exactly without being affected by a variation in relative humidity of the ambient atmosphere, which variation would otherwise cause such a deformation of the drawing sheet that brings about an inferior precision of the drawing.

Figure 3:
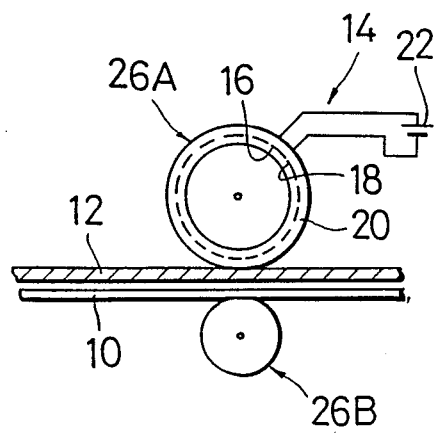
FIG. 3 is a side elevation of another electrostatic attraction device in a second embodiment.

In a second embodiment as shown in FIG. 3, an electrostatic attraction device 14 comprises an attracting part 20 located at an outer periphery of a first rotatable roller 26A that is coupled with a second rotatable roller 26B. A pair of electrodes 16 and 18 are embedded in the attracting part 20 and are connected to a power source 22. A drawing sheet of paper 10 is positioned to face the second roller 26B, with a reinforcing sheet facing the first roller 26A so that these sheets 10 and 12 are gripped to advance between these rollers. In this second embodiment, the attracting part 20 having charges electrostatically induced by the pair of electrodes 16 and 18 that are carried by the first roller 26A do in turn induce electrostatic charges within the reinforcing sheet 12 in contact with said attracting part 20. The drawing sheet 10 is also charged electrostatically through said reinforcing sheet at the same time so as to attract one to another. By such a composition, the structure of the paper sheet transporting apparatus is simplified in structure because both the electrodes 16 and 18 are installed only in one roller, i,e., the first roller 26A.

In a modified example of the second embodiment, the reinforcing sheet 12 is located to face the second roller 26B, the drawing sheet 10 being arranged to come in contact with the first roller 26A. The reinforcing sheet in this case is induced through the drawing sheet so as to have electrostatic charges and to attract each other.

Figure 4:
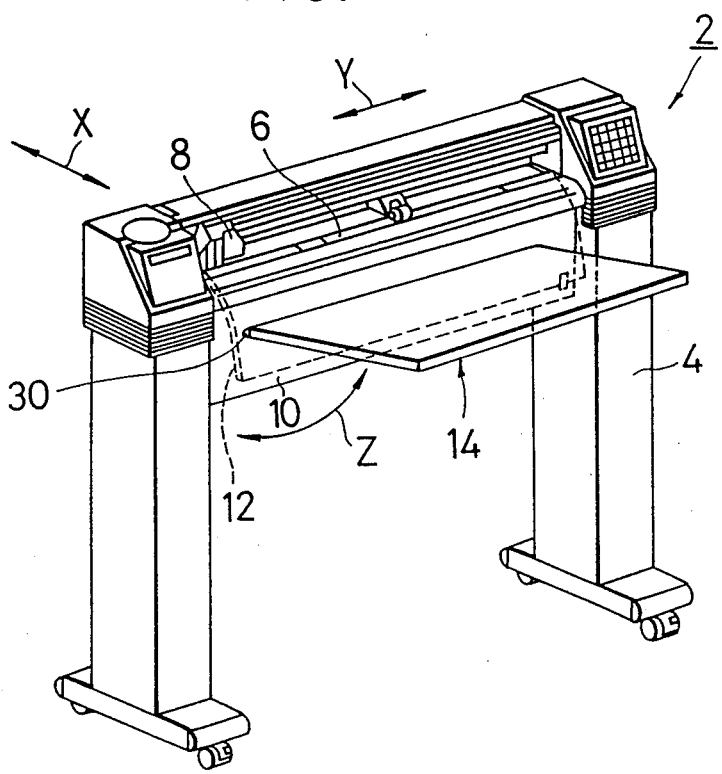
FIG. 4 is a perspective view showing a third embodiment of the invention in an X-Y plotter.
Figure 5:
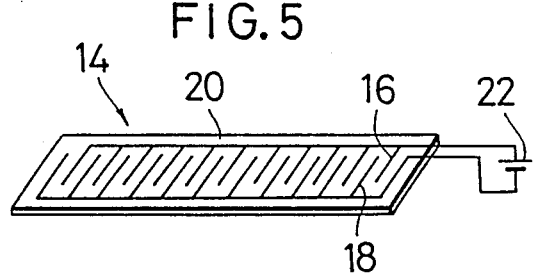
FIG. 5 is a perspective view showing an electrostatic attraction device in the third embodiment.
Figure 6:
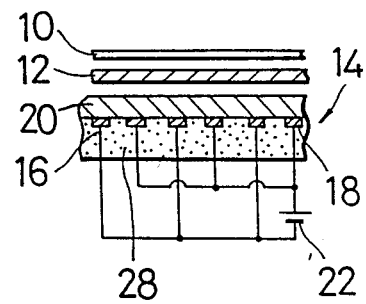
FIG. 6 is an enlarged cross section of the electrostatic attraction device shown in FIG. 5.

In a third embodiment shown in FIGS. 4 to 6, an electrostatic attraction device 14 is made integral with an X-Y plotter 2. In the electrostatic attraction device 14, as illustrated in FIGS. 5 and 6, a plane attracting part 20 is provided with a pair of comb shaped electrodes 16 and 18 that are connected to a power source 18 This plane electrostatic attraction device 14 is, as in FIG. 4, integral with a main body 4 of the X-Y plotter 2. The numeral 28 in FIG. 6 denotes an insulating material.

Lease of drawing operations is further improved in this embodiment wherein the attraction device is integral with the plotter, and especially in such a composition wherein said device 14 is rockable by means of a hinge 30 in a direction of an arrow 2 relative to the main body 4. Said device 14 may take a horizontal position when used, and may take a depending position when not used.

Figure 7:
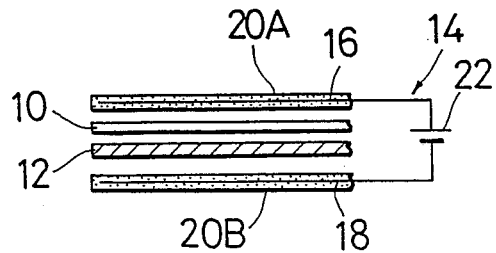
FIG. 7 is a cross section of an electrostatic attraction device in a fourth embodiment.

In a fourth embodiment in FIG. 7, an electrostatic attraction device 14 comprises a pair of plane first and second attracting parts 20A and 20B each provided with an electrode 16 or 18 that are connected to a power source 22. Also in this embodiment, a drawing sheet of paper 10 and a reinforcing sheet 12 are put through a gap between the attracting parts 20A and 20B so that said sheets are simultaneously induced to have electrostatic charges which cause said sheets to attract each other.

The drawing sheet 10 in the fourth embodiment is directly charged, and both the sheets 10 and 12 are instantly charged over their entire surfaces, thus further making stronger the attracting forces between them.

Although the reinforcing sheets in the above-described embodiments are those which are for the drawing sheets in the X-Y plotter, said reinforcing sheets may be utilized in other apparatuses or machines as a copying machine which have such a transporting roller 6 as in the described embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A paper sheet transporting method comprising:

a step of superposing a paper sheet on a reinforcing sheet;

a step of affording an electrostatic attractive force between the paper sheet and the reinforcing sheet due to electrostatic charges given to said paper sheet and said reinforcing sheet;

the reinforcing sheet being made of a substance selected from plastics that are of a highly insulating nature and retain the electrostatic charge for a long period of time so as to have a remaining attractive force; and a step of gripping the thus electrostatically charged paper sheet and the charged reinforcing sheet between a pair of transporting rollers, and thereby transporting said paper sheet and reinforcing sheet in a tangential direction of said rollers while said sheets are still sticking to each other, whereby the paper sheet is transported by the reinforcing sheet to a work station therefor without producing any deformation or torsion, wherein the paper sheet is removed form the reinforcing sheet after being processed at the work station.

2. The paper sheet transporting method according to claim 1, wherein the paper sheet is selected from a group consisting of a drawing paper and a copying paper, the drawing paper being used in an X-Y plotter as the work station, the copying paper being used in a copying machine also as the work station; and the reinforcing sheet has a value of volume resistivity of or higher than $10^{13}$ $\Omega$cm and a thickness of about 20 to 150 $\mu$m.

3. The paper sheet transporting method according to claim 2, wherein the paper sheet and the reinforcing sheet are electrostatically charged at the same time by means of an electrostatic attraction device.

4. The paper sheet transporting method according to claim 3, wherein said paper sheet and said reinforcing sheet are electrostatically charged by the pair of transporting rollers which have polarities different from each other.

5. The paper sheet transporting method according to claim 3, wherein said paper sheet and said reinforcing sheet are electrostatically charged by the pair of transporting rollers, one of said rollers is provided with a pair of positive and negative electrodes such that the paper sheet is electrostatically charged through and simultaneously with the reinforcing sheet which is in contact with the one roller.

6. A paper sheet transporting method according to claim 3, wherein said paper sheet and said reinforcing sheet are electrostatically charged by the pair of transporting rollers, wherein the electrostatic attraction device is man integral with the work station.

7. The paper sheet transporting method according to claim 3, wherein said paper sheet and said reinforcing sheet are electrostatically charged by the pair of transporting rollers, wherein the electrostatic attraction device is integral with the work station.

* * * * *